Aug. 4, 1931.                T. E. CROCKETT                1,817,127
                             UNLOADING VALVE
                           Filed Nov. 19, 1930
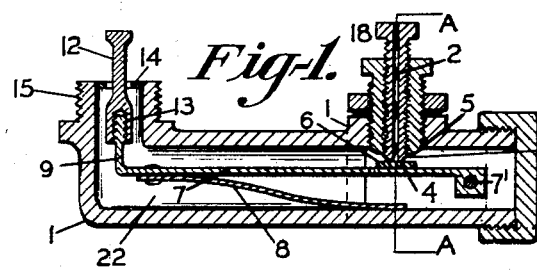
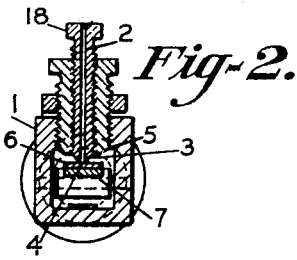
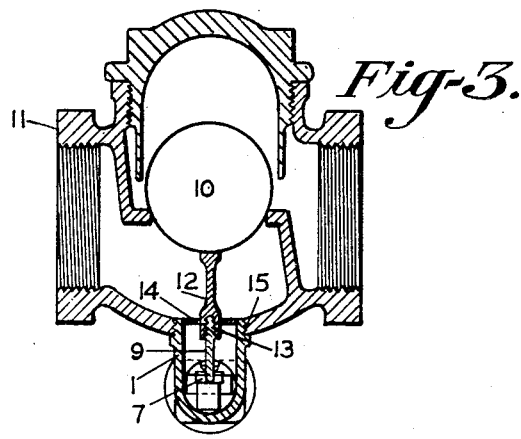
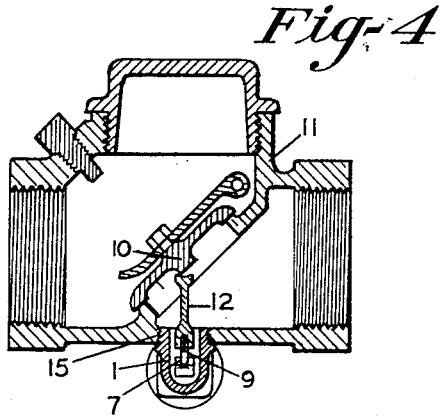
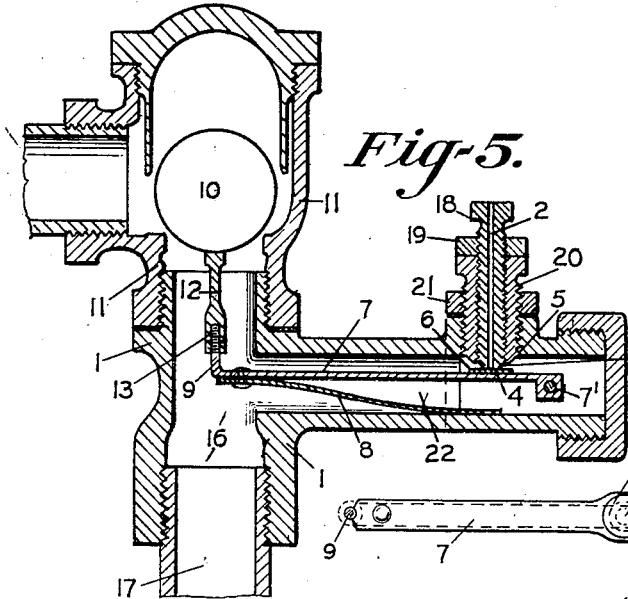
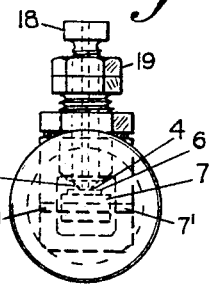
Thomas E. Crockett
INVENTOR Patented Aug. 4, 1931

1,817,127

UNITED STATES PATENT OFFICE

THOMAS E. CROCKETT, OF TULSA COUNTY, OKLAHOMA, ASSIGNOR OF ONE-HALF TO WILLIAM H. BLAKLEY AND JAMES R. COLE, BOTH OF TULSA, OKLAHOMA

UNLOADING VALVE

Application filed November 19, 1930. Serial No. 496,758.

My invention relates to unloading valves, primarily for use on compressor lines between check valve and compressor, and generally for other like uses to which it may be applied, for relieving the line pressure between the check valve and the compressor when the compressor stops or the line pressure reduced to such a degree that the check valve closes; and consists of an unloading valve adapted to be built as a unit in itself and to be installed in a pipe line with any kind of check valve having a moving valve part, such as a ball valve or a flap valve, and operative either with a horizontal check valve or a vertical check valve or an angle check valve, and positioned in said line so that the check valve may actuate it; or, an unloading valve which may be attached to the check valve itself; or one which may be made integral with any style of check valve as aforesaid; and which is so designed that the operative mechanism in said unloading valve is removed from the passage way or duct of the pipe line, and shielded from the flow of the fluid thru said pipe line.

Automatic unloading valves for use as aforesaid as now made and used are either centrifugally or electrically operated. My invention resides in providing an automatic unloading valve actuated by a check valve and which is practical to use under temperatures and pressures prevailing in the general use of such unloading valves.

To provide such a valve in form adapted to be made as a unit for installation on the conventional check valve or in the pipe line with a conventional check valve; to provide such a valve in manner that either it or the check valve with which it cooperates may be replaced without replacing both valves; to make use of the present check valves; to provide an unloading valve in which the parts will not wear excessively, which will not stick, in which the foreign matter contained in the air will not clog the valve, nor the oil in the air and which is present by reason of passing thru the compressor, will not together with the heat generated by compression, warp or clog the valve or cause it to stick; to protect the mechanism of the unloading valve as much as possible from the fluid passing thru the pipeline, so as to not subject the valve to unnecessary heat or permit it unnecessarily to gather the foreign substances carried in the air; to provide a means whereby the valve seat may be replaced without rendering the valve inoperative during the time of replacement; to provide such a valve in uniform size to be affixed to check valves of various sizes and of various types without having to make and carry an excessive quantity of the check and unloading valve combined; to provide an adjustable lever arm on the lever of the unloading valve which will permit the check valve and unloading valve to operate in harmony when the two are combined; and to combine all of these features to the effect that a practical unloading valve may be cheaply made, will wear well, and may be cheaply and conveniently replaced.

With the above stated and other objects in view which will appear as the description proceeds, my invention consists in the novel features herein set forth in detail, illustrated in the accompanying drawings, and more particularly pointed out in the appended claims.

Referring to the drawings in which numerals of like character designate similar parts thruout the several views:

Fig. 1 is a view in longitudinal cross section, of the unloading valve made in unit form adapted to be affixed to any style of horizontal check valve of the conventional form.

Fig. 2 is a view in lateral cross section of said valve on line A—A of Fig. 1.

Fig. 3 is a view in longitudinal cross section of a conventional horizontal ball check valve, with the unloading valve shown in Fig. 1 shown in lateral cross section.

Fig. 4 is a view in longitudinal cross section of a conventional horizontal flap valve check, with the unloading valve shown as in Fig. 3, attached thereto.

Fig. 5 is a view in longitudinal cross section of the unloading valve with its body portion built in a T form of fitting and constituting a conduit fitting on a pipeline to which it may be affixed and connected in the line with a conventional ball check valve of the angle type check valve.

Fig. 6 is a view in end elevation of the unloading valve.

Fig. 7 is a top plan view of the unloading valve lever carrying primary and secondary valve stops thereon.

1 represents generally the body portion of the unloading valve, 2 the port of the unloading valve, 3 the seat of said port, the same being the primary valve seat, 4 the valve for said seat, 5 the secondary seat, the same being concentric with the primary and permanent seat 3, and 6 the secondary valve for said secondary seat 5.

7 represents the valve lever which is fulcrumed at one end by a pivot pin 7' affixed to the body portion of said unloading valve; 8 the tension means, shown as a spring, for compressing the valve 4 against its seat 3, thus closing the unloading valve when the lever 7 is not being actuated by the check valve; 9 the bent portion of the valve lever 7, and with said bent portion positioned substantially in axial alinement with the actuating force of said lever, which said actuating force is the moving valve portion or valve member 10 of a conventional check valve shown generally at 11. The check valve may be in any of the conventional types such as a horizontal valve as at Figs. 3 and 4, or an angle valve as at Fig. 5, or a vertical check valve which is not shown but is the same as the check valve shown in Fig. 5, excepting that its outlet is at the top instead of at the side, but with the valve and valve seat arranged the same and adapted to actuate the unloading valve the same as does the angle valve shown. The moving valve portion of the check valve may be of any type such as a ball valve or a flap valve, both of which are shown in the drawings.

On the bent lever 9 may be placed a stem 12, which is an integral part of the lever, and is adapted to be used for adjusting the length of the lever, so that the valve 10 may properly actuate the lever 7 when opening the unloading valve, and properly release the lever 7 in closing the unloading valve. It is adjusted by screw connection 13 to the end of the bent portion of the lever and is adjusted after both valves are in place with each other thru the removable cover of the check valve, and is used only as a convenience in place of cutting or trimming down the lever to proper length. Where the stem 12 is very long and necessity arises for its use, a stem guide 14 as shown in Figs. 1 and 3, the same being in the form of a disk or a spider guide of conventional design is inserted to prevent lateral play of the valve stem when actuated by the valve 10.

The form of unloading valve body shown in Figs. 1, 3 and 4, is adapted to be connected into a horizontal check valve as shown by threaded connections 15, and in that form the body does not form a conduit member of the pipeline in which the check valve may be placed, and the entire mechanism of the unloading valve, except a portion of the valve lever, is removed from and shielded from the fluid as it passes thru the valve, and not subjected to the heat of the moving fluid nor to the foreign matter contained in it, and none of the bearings or contact portions of the unloading valve are exposed to such effects.

The form of unloading valve body shown in Fig. 5, is adapted to be used with an angle check valve or a vertical check valve, and carries with it the same features of protection to the unloading valve mechanism against the effect of the flow of the hot gases and the foreign substances carried by the fluid. In this particular form a part of the unloading valve body is a member of the pipeline conduit as the fluid passes thru its duct 16 from the pipeline 17 into the check valve 11. It is obvious that in this arrangement the duct 16 and the unloading valve duct or chamber 22 is of the conventional pipeline T fitting, and that such a fitting could be used and the body portion of the unloading valve threaded at the open end and connected into the stem opening of the T fitting.

It is also readily apparent that both check valve and unloading valve can be made in one body, and the two valves made in one unit. However in the other form, replacement of one valve without replacement of the other may be made, and moreover the other form is adaptable for use with the present check valves already in use so that in many instances the one form of unit valves would not serve the purpose of providing an unloading valve independent of the check valve, and moreover the making and carrying of excessive stocks of all sizes and kinds of the combined unit would be avoided by providing the attachable form of unloading valve.

Referring again to the drawings, 18 is a screw carrying the port 2 and valve seat 3, with lock nut 19 on said screw, said screw 18 being threaded into another screw 20 carrying the secondary valve seat 5 with locknut 21 for said screw. Thus is provided means for replacing a worn seat 3 without disturbing the operation of the unloading valve, as the secondary seat can be screwed down to operatively replace the primary seat, whereupon the primary seat may be withdrawn by removing the screw 18.

In operation the unloading valve is placed in communication with the inlet side of the check valve. When fluid is freely passing thru the pipeline, the check valve is open and the moving valve member 10 is removed from contact with the unloading valve 7 or its constituent member 12, by the force of the flow of the fluid. When that force decreases, the valve 10 is caused by gravity to bear upon the lever 7, and as the valve 10 continues to move to its seat the weight of the valve 10 actuates the lever 7 against the tension thereon applied by the tension means or spring 8, and releases the valve 4 from its seat 3 at the port 2, thus causing the unloading valve to unload the pressure in the line between check valve and compressor, and after the valve 10 in the check valve is seated, its weight continues to hold the unloading valve open.

With the pressure relived in the line, the compressor may then easily start with little load, building up pressure until it is sufficient to open the check valve against the back pressure exerted upon it, and when the pressure is suffiicent, it causes the valve 10 of the check valve to raise, releasing the lever 7 and causing the unloading valve to be closed by the pressure of the tension member 8 exerted on said lever.

Having thus fully disclosed my invention of an unloading valve wherein the various features embraced are shown, what I claim and desire to secure by Letters Patent is:

1. An unloading valve comprising; a body portion; a valve port in said body portion; a valve port seat for said valve port; a lever fulcrumed at one end and pivotally secured within said body portion, and having its power point at its free end; a valve positioned on said lever between its fulcrum point and its power point and adapted to engage said valve port seat and close said valve port; tension means for applying tension on said lever in a direction towards said valve port to cause said valve on said lever to close said port when said lever is not subjected to its actuating power, and with the free end of said lever adapted to be engaged by the moving valve portion of a check valve and to be actuated by it in a direction opposed to the tension applied to it by said tension means, to the effect that said valve port is caused to be opened by the power applied by said moving valve portion of said check valve; means for connecting said unloading valve with said check valve at the inlet side of said check valve, and with said valve port of said unloading valve communicating with said check valve; means of actuating said lever with the moving valve portion of said check valve, to cause the valve port of the unloading valve to be open when said check valve is closed.

2. An unloading valve as claimed in claim 1; and with the free end of said lever bent to a position substantially in axial alinement with the direction of the power applied to it to cause the unloading valve to open.

3. An unloading valve as claimed in claim 1; and with the free end of said lever bent to a position substantially in axial alinement with the direction of the power applied to it to cause the unloading valve to open; and means of adjusting the length of said lever at its free end to adapt it to proper application at varied distances between the valve of the unloading valve and the valve of the check valve.

4. An unloading valve as claimed in claim 1; and with the free end of said lever bent to a position substantially in axial alinement with the direction of the power applied to it to cause the unloading valve to open; and means to guide said lever against any lateral play thereof caused by the application of power to said lever.

5. A pipe line conduit member adapted to be connected into a pipeline in proximity with a check valve having a moving valve portion, and on the inlet side of said check valve, and with said pipeline conduit member having therein contained an unloading valve adapted to automatically unload the pressure in said pipe line through the action of the moving valve portion of said check valve in moving to its seat; means for substantially shielding the operative mechanism of said unloading valve from direct contact with the flow of fluid through said pipeline conduit member, said unloading valve comprising a valve port; a valve port seat for said valve port; a lever fulcrumed at one end and pivotally secured to said pipeline conduit member and having its power point at its free end; a valve positioned on said lever between its fulcrum and its power point and adapted to engage said valve port seat and close said valve port; tension means for applying tension on said lever in a direction towards said valve port to cause said valve stop on said lever to close said port when said lever is not subjected to its actuating power, and with the free end of said lever bent to a position substantially in axial alinement with the direction of the power applied to it to cause the unloading valve to open, and adapted to be engaged by the moving valve portion of said check valve; and means of actuating said lever with the moving portion of said check valve to cause the valve port of the unloading valve to be open when said check valve is closed.

6. An unloading valve as claimed in claim 1; and means of substantially shielding the operative mechanism of said unloading valve from direct contact wth the flow of fluid thru said check valve.

7. An unloading valve as claimed in claim 1; and with the free end of said lever bent to a position substantially in axial alinement with the direction of the power applied to it to cause the unloading valve to open; and means for substantially shielding the operative mechanism of said unloading valve from direct contact with the flow of fluid thru said check valve.

8. An unloading valve adapted to be engaged with and actuated by the moving valve portion of a check valve and with said unloading valve comprising a body portion integral with said check valve; an unloading valve port in said body portion communicating with said check valve on its inlet side; a valve port seat for said valve port; a lever fulcrumed at one end and pivotally secured to said body portion and having its power point at its free end; a valve positioned on said lever between its fulcrum point and its power point and adapted to engage said valve port seat and close said valve port; tension means for applying tension on said lever in a direction towards said valve port to cause said valve stop on said lever to close said port when said lever is not subjected to its actuating power, and with the free end of said lever adapted to be engaged by the moving valve portion of said check valve and to be actuated by it in a direction opposed to the tension applied to it by said tension means, to the effect that said valve port is caused to be opened by the power applied by said moving portion of said check valve; means of actuating said lever with the moving portion of said check valve to cause said valve port of said unloading valve to be open when said check valve is closed.

9. An unloading valve adapted to be engaged with and actuated by the moving valve portion of a check valve and with said unloading valve comprising a body portion integral with said check valve, as claimed in claim 8; and with the free end of said lever bent to a position substantially in axial alinement with the direction of the power applied to it to cause the unloading valve to open.

10. An unloading valve adapted to be engaged with and actuated by the moving valve portion of a check valve and with said unloading valve comprising a body portion integral with said check valve, as claimed in claim 8; and with the free end of said lever bent to a position substantially in axial alinement with the direction of the power applied to it to cause the unloading valve to open; and means of adjusting the length of said lever at its free end to adapt it to proper application at varied distances between the unloading valve and the check valve.

In testimony whereof I affix my signature.

THOMAS E. CROCKETT.